United States Patent Office 3,254,047
Patented May 31, 1966

3,254,047
ADDITIVES FOR INCREASING MODULUS OF ELASTICITY OF POLYCARBONATE FILMS
John R. Caldwell and Winston J. Jackson, Jr., Kingsport, Tenn., assignors to Eastman Kodak Company, Rochester, N.Y., a corporation of New Jersey
No Drawing. Filed Sept. 14, 1961, Ser. No. 137,979
2 Claims. (Cl. 260—33.2)

This invention relates to additives for increasing the modulus of elasticity of films made from polycarbonates. More particularly the invention relates to such additives for polycarbonates of bisphenols.

An object of the invention is to provide novel polycarbonate mixtures containing additives for improving the modulus of elasticity (the measure of stiffness) of films made from bisphenol polycarbonates. Another object of the invention is to provide means for improving the elastic properties of films made from thermoplastic polycarbonates of bisphenols.

According to the invention, a homogeneous mixture consisting of from 60 to 90%, preferably between 70 and 85%, of a bisphenol polycarbonate and from 10 to 40%, preferably between 15 and 30%, of one of the additives of the invention, is prepared. A film can then be made from the mixture by extrusion or by solvent casting. Additives which are found to improve stiffness of bisphenol polycarbonate films are:

(1) Polystyrene glycol,
(2) Polystyrene thioglycol,
(3) Chlorinated aromatic polynuclear hydrocarbons containing from 30 to 75% nuclear chlorine,
(4) Esters of saturated and unsaturated abietic acid,
(5) Abietyl alcohols, both saturated and unsaturated, and
(6) Esters of saturated and unsaturated abietyl alcohols.

Polycarbonates from bisphenols possess properties that make them particularly useful for making films for photographic film backing and for other purposes. A number of polycarbonates from aliphatic and cycloaliphatic bisphenols are described in Schnell, Angew, Chem., 68, 633–660, No. 20 (1956). Other polycarbonates are described in our copending application titled Bisphenol Polyesters filed of even date herewith. The polycarbonate of 4,4'-(isopropylidene)diphenol, called "Bisphenol A," is now marketed as "Lexan."

In many applications of films high modulus of elasticity is required. This is particularly true for photographic film base. The additives of the invention make it possible to improve stiffness of films made from polycarbonates.

Polystyrene glycol is the commercial name for the diol of poly-(phenylethylene oxide):

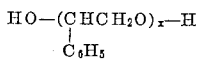

Polystyrene glycols having molecular weights from 378 to 3000 ($X=3$–25) are suitable as additives for improving stiffness of films according to the invention.

Polystyrene thioglycol is a polymer from phenylethylene sulfide. It has the structure

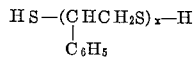

Thioglycols suitable for the invention range in molecular weight from 440 to 3400 ($X=3$–25).

Chlorinated aromatic polynuclear hydrocarbons containing 30–75 percent nuclear chlorine are suitable as additives to improve stiffness of polycarbonate films. Types of aromatic polynuclear hydrocarbons which may be chlorinated for this purpose are diphenyl, the terphenyls (o, m, and p), naphthalene, phenanthrene, and anthracene. Also, chlorinated aromatic compounds with the following structures are effective:

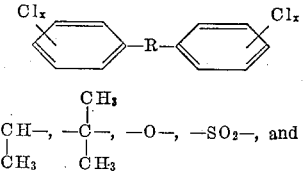

$R=-CH_2-$, $-\underset{CH_3}{\overset{CH_3}{C}H}-$, $-\underset{CH_3}{\overset{CH_3}{C}}-$, $-O-$, $-SO_2-$, and $-OCH_2CH_2O-$ Chlorinated diphenyls containing from 40 to 70 percent chlorine are useful.

Additional additives for improving stiffness of polycarbonate films are diabietates of aliphatic and cycloaliphatic diols containing from 2 to 20 carbon atoms. The aliphatic diols from which the diabietates are made may be straight or branched. Aromatic or alicyclic groups may be present. Examples of some of these diols are 1,4-butanediol; 1,10-decanediol; 2,2-dimethylpropanediol; 2,2,4-trimethyl-1,3-pentanediol; 1,4-cyclohexanedimethanol; 1,4-alpha, alpha'-xylylenediol; 1,4-cyclohexanediol; 2,5-norcamphanediol. Also, ether linkages may be present, as represented in diethyleneglycol, and tetraethyleneglycol. Also, polyhydroxy compounds containing from 3 to 15 carbon atoms can be used, such as glycerol or pentaerythritol. Diabietates may be prepared from unsaturated abietic acid or from hydrogenated abietic acid. Technical grades of abietic acid and rosin acids can be employed in preparing the glycol esters.

Mono-esters of abietic and hydrogenated abietic acids and monohydroxy alcohols containing from 1 to 20 carbon atoms are also useful as stiffening additives. Typical alcohols are methanol, 2-ethylhexanol, cyclohexanol, 2-norcamphanol, and benzyl alcohol.

Abietyl alcohol and hydrogenated abietyl alcohol are suitable as additives for increasing the elastic modulus of polycarbonates. Hydrogenation of abietic acid and abietyl alcohol reduces the two double bonds in the compounds.

Esters from unsaturated and hydrogenated abietyl alcohols and mono- and di-esters obtained from these two alcohols and mono- and dicarboxylic acids are also suitable additives for increasing the elastic modulus of polycarbonates. Their esters with rosin are quite useful. Other esters were prepared by conventional esterification procedures. Monocarboxylic acids suitable for making these esters are those containing from 1 to 20 carbon atoms. Aliphatic chains in the acids may be straight or branched. Aromatic or alicyclic groups may be present. Examples of some of the acids are acetic, 2-ethylhexaneoic, cyclohexanecarboxylic, 2-norcamphanecarboxylic, benzoic, and phenylacetic. Ether linkages may be present, such as in phenoxyacetic acid. Dicarboxylic acids may be used which contain from 2 to 20 carbon atoms, and the chains may be straight or branched. Aromatic or alicyclic groups may be preesnt. Examples of some of these acids are adipic, dimethylmalonic, 1,4-cyclohexanedicarboxylic, isophthalic, and 2,5-norcamphanedicarboxylic. Ether linkages may be present, such as in diglycolic acid.

Any one of the additives mentioned above may be added to the polycarbonate before preparing films. After addition of the additive to the polycarbonate, the additive content should be 10–40 weight percent of the mixture. The preferred amount is between 15 and 30 percent. The modulus of elasticity of the polycarbonate films increases with the amount of additive which is present and the heat-distortion temperature decreases.

The polycarbonate films may be extruded, or they may be cast from various solvents such as methylene chloride, chloroform, ethylene dichloride, and (with certain types of polycarbonates) toluene. The additive may be mixed with the polycarbonate before the dope is prepared using one of these solvents, or the additive may be added to the dope containing the polycarbonate. After the dope mixture becomes homogeneous, films are cast in the usual manner.

To illustrate the invention a number of polycarbonates were prepared by condensation of phosgene with various bisphenols. The polycarbonates were then mixed with various of the additives listed above and organic solvent (methylene chloride) was used to prepare dopes from which films were cast. Films were similarly prepared from the polycarbonates without additives. Modulus of elasticity in tension (Young's modulus, E) of the films with and without additives were measured and are compared in the tables below.

In Table I the polycarbonates are listed according to the particular bisphenol from which each was made.

TABLE I.—BISPHENOL POLYCARBONATES

Polycarbonates were prepared from phosgene and:

(1) Bisphenol A
(2) 4,4'-(2-norcamphanylidene) diphenol
(3) 4,4'-(hexahydro-4,7-methanoindan-5-ylidene) diphenol
(4) 4,4'-(2-norcamphanylidene) bis(2,6-dichlorophenol)
(5) 4,4'-(3-methyl-2-norcamphanylmethylene) diphenol
(6) 4,4'-(phenylmethylene) diphenol
(7) 4,4'-(cyclohexylidene) diphenol
(8) 4,4'-(2,4,6-trichloro-alpha-methyl-benzylidene) diphenol Table II lists the various mixtures of polycarbonate and additive used for making the film. The number in column 1 identifies the polycarbonate from phosgene and the bisphenol having the corresponding number in Table I. In column 2 the additive is identified. In column 3 the weight percent of additive in the mixture is shown. In column 4 is shown the modulus of elasticity of a film of the polycarbonate without plasticizer and in column 5 is shown the modulus of elasticity of a film of the polycarbonate-additive mixture. All films were cast from methylene chloride unless otherwise indicated.

TABLE II

| Polycarbonate | Additive | Weight Percent Additive | Young's Modulus without Additive p.s.i. ×10⁻⁵ | Young's Modulus with Additive p.s.i. ×10⁻⁵ |
|---|---|---|---|---|
| 1 | Chlorinated diphenyl (54% Cl) | 17 | 3.5 | 4.6 |
| 1 | Chlorinated o-terphenyl (48% Cl) | 20 | 3.5 | 4.3 |
| 2 | Chlorinated diphenyl (40% Cl) | 20 | 4.0 | 4.9 |
| 2 | Chlorinated diphenylmethane (58% Cl) | 20 | 4.0 | 5.1 |
| 3 | Chlorinated diphenyl (54% Cl) | 15 | 3.8 | 4.9 |
| 3 | Chlorinated diphenyl (54% Cl) | 20 | 3.8 | 5.3 |
| 4 | Chlorinated naphthalene (52% Cl) | 15 | 4.9 | 5.5 |
| 5 | Chlorinated diphenyl ether (46% Cl) | 20 | 4.5 | 5.2 |
| 6 | Chlorinated naphthalene (44% Cl) | 20 | 3.5 | 4.0 |
| 7 | Chlorinated anthracene (56% Cl) | 20 | 3.6 | 4.4 |
| 8 | Chlorinated diphenyl (54% Cl) | 20 | 4.5 | 5.2 |
| 3 | Chlorinated diphenyl (71% Cl)ᵃ | 15 | 3.8 | 5.0 |
| 3 | Chlorinated benzene (75% Cl)ᵃ | 15 | 3.8 | 4.9 |
| | Diester of hydrogenated abietic acid and: | | | |
| 1 | Triethylene glycol | 15 | 3.5 | 4.1 |
| 3 | Triethylene glycol | 15 | 3.8 | 4.6 |
| 4 | 2,2-dimethyl-propanediol | 20 | 4.9 | 5.5 |
| 8 | 2,5-norcamphanediol | 15 | 4.5 | 5.1 |
| | Ester of unsaturated abietic acid and: | | | |
| 1 | 1,4-cyclohexanedimethanol | 15 | 3.5 | 4.2 |
| 2 | 1,6-hexanediol | 20 | 4.0 | 4.8 |
| 3 | Glycerol | 20 | 3.8 | 4.4 |
| 5 | 1,4-alpha,alpha'-xylylenediol | 30 | 4.5 | 5.4 |
| 7 | Pentaerythritol | 15 | 3.6 | 4.2 |
| | Ester of hydrogenated abietic acid and: | | | |
| 3 | Methanol | 20 | 3.8 | 5.0 |
| | Ester of unsaturated abietic acid and: | | | |
| 2 | Cyclohexanol | 20 | 4.0 | 5.1 |
| 3 | Methanol | 20 | 3.8 | 5.0 |
| 6 | 2-ethylhexanol | 20 | 3.5 | 4.3 |
| | Ester of hydrogenated abietyl alcohol and: | | | |
| 1 | Acetic acid | 20 | 3.5 | 4.4 |
| 2 | Benzoic acid | 20 | 4.0 | 4.9 |
| 5 | Cyclohexanecarboxylic | 20 | 4.5 | 5.2 |
| | Ester of unsaturated abietyl alcohol and: | | | |
| 5 | Cyclohexanecarboxylic acid | 20 | 4.5 | 5.2 |
| | Diester of hydrogenated abietyl alcohol and: | | | |
| 1 | Adipic acid | 15 | 3.5 | 4.1 |
| 3 | Isophthalic acid | 30 | 3.8 | 5.4 |
| 6 | Dimethylmalonic acid | 20 | 3.5 | 4.2 |
| 5 | Diglycolic acid | 15 | 4.5 | 5.0 |
| 3 | Saturated abietyl alcohol | 20 | 3.8 | 4.7 |
| 3 | Unsaturated abietyl alcohol | 15 | 3.8 | 4.4 |
| 1 | Polystyrene glycol (mol. wt. 750) | 20 | 3.5 | 4.2 |
| 2 | Do | 20 | 4.0 | 4.9 |
| 3 | Do | 20 | 3.8 | 5.1 |
| 3 | Do | 30 | 3.8 | 5.1 |
| 4 | Polystyrene glycol (mol. wt. 500) | 15 | 4.9 | 5.4 |
| 5 | Polystyrene glycol (mol. wt. 3,000) | 15 | 4.5 | 5.0 |
| 6 | Polystyrene glycol (mol. wt. 2,000) | 20 | 3.5 | 4.1 |
| 7 | Polystyrene glycol (mol. wt. 380) | 20 | 3.6 | 4.3 |
| 8 | Polystyrene glycol (mol. wt. 1,000) | 20 | 4.5 | 5.2 |
| 1 | Polystyrene thioglycol (mol. wt. 700) | 20 | 3.5 | 4.1 |
| 2 | Polystyreye thioglycol (mol. wt. 440) | 20 | 4.0 | 4.7 |
| 3 | Polystyrene thioglycol (mol. wt. 700) | 20 | 3.8 | 5.0 |
| 3 | Polystyrene tholglycol (mol. wt. 700) | 30 | 3.8 | 5.5 |
| 4 | Polystyreye thioglycol (mol. wt. 1,200) | 20 | 4.9 | 5.6 |
| 5 | Polystyrene thioglycol (mol. wt. 1,200) | 20 | 4.5 | 5.2 |
| 6 | Polystyrene thioglycol (mol. wt. 2,200) | 15 | 3.5 | 3.9 |
| 7 | Polystyrene thioglycol (mol. wt. 3,400) | 15 | 3.6 | 4.0 |
| 8 | Polystyrene thioglycol (mol. wt. 3,400) | 20 | 4.5 | 5.1 |

ᵃ The film was cast from toluene on a surface at 40° C. to inhibit crystallization of the additive.

The above examples are given as specific embodiments to illustrate the invention and are not to be construed to limit the scope of the invention as defined in the following claims.

We claim:
1. A composition consisting essentially of from 90 to 60 weight percent of a thermoplastic polycarbonate of a bisphenol and from 10 to 40 weight percent of a polystyrene glycol stiffness improving additive having a molecular weight from 378 to 3,000.
2. An improved thermoplastic polycarbonate film having an increased modulus of elasticity and consisting essentially of from 90 to 60 weight percent of a thermoplastic polycarbonate of a bisphenol and from 10 to 40 weight percent of a polystyrene glycol stiffness improving additive having a molecular weight from 378 to 3,000.

References Cited by the Examiner

UNITED STATES PATENTS

| | | | |
|---|---|---|---|
| 2,035,578 | 3/1936 | Wagner | 260—47 X |
| 2,789,971 | 4/1957 | Reynolds et al. | 260—860 |
| 3,030,335 | 4/1962 | Goldberg | 260—47 X |
| 3,148,172 | 9/1964 | Fox | 260—77.5 |

LEON J. BERCOVITZ, *Primary Examiner.*

MILTON STERMAN, *Examiner.*

H. W. HAEUSSLER, C. WARREN IVY,
*Assistant Examiners.*